United States Patent [19]

Robbins et al.

[11] Patent Number: 4,646,150
[45] Date of Patent: Feb. 24, 1987

[54] APPARATUS AND METHOD FOR STEREO TELEVISION SOUND

[75] Inventors: Clyde Robbins, Maple Glen; Daniel J. Marz, Holland, both of Pa.

[73] Assignee: General Instrument Corporation, New York, N.Y.

[21] Appl. No.: 816,133

[22] Filed: Jan. 3, 1986

[51] Int. Cl.⁴ .............................................. H04N 7/04
[52] U.S. Cl. .................................... 358/144; 358/197; 358/198; 381/1; 381/2; 381/10; 455/202; 455/205
[58] Field of Search ................. 358/141, 142, 143, 86, 358/144, 197, 198; 381/1, 2, 3, 4, 10; 455/202, 203, 205, 214

[56] References Cited

U.S. PATENT DOCUMENTS

| | | | |
|---|---|---|---|
| 3,046,329 | 7/1962 | Reesor | 358/198 |
| 3,099,707 | 7/1963 | Dome | 358/198 |
| 3,221,098 | 11/1965 | Feldman et al. | 358/198 |
| 3,257,511 | 6/1966 | Adler et al. | 381/4 |
| 4,048,654 | 9/1977 | Wegner | 358/144 |
| 4,339,772 | 7/1982 | Eiler et al. | 358/144 |
| 4,405,944 | 9/1983 | Eilers et al. | 358/144 |
| 4,472,830 | 9/1984 | Nagai | 358/144 |
| 4,577,226 | 3/1986 | Avins | 358/144 |
| 4,603,349 | 7/1986 | Robbins | 358/86 |

OTHER PUBLICATIONS

"Television Multichannel Sound Broadcasting—A Proposal", by Carl G. Eilers, IEEE Transactions on Consumer Electronics, vol. CE-27, No. 3, pp. 398-409, (Aug. 1981).

*Primary Examiner*—James J. Groody
*Assistant Examiner*—Michael D. Parker
*Attorney, Agent, or Firm*—Barry R. Lipsitz

[57] ABSTRACT

An apparatus and method are provided for receiving and reproducing stereo television sound. A transmitted television signal is received that contains a first component comprising the sum of first and second stereophonically related audio signals and a second component comprising the difference between the first and second stereophonically related audio signals. The first and second components are converted to produce a first sound carrier centered at a first intermediate frequency and a second sound carrier centered at a second intermediate frequency. The first component is detected from the first sound carrier at the first intermediate frequency. The second component is detected from the second sound carrier at the second intermediate frequency. The detected first and second components are combined to produce a left channel audio output and a right channel audio output. By using a standard intercarrier detector for the first (L+R) component and an independent FM detector for the second (L−R) component, distortion caused by interfering harmonics of the television horizontal line frequency with vertical scan frequency sidebands falling within the (L−R) subchannel is prevented. A second audio program ("SAP") signal can also be recovered using the independent FM detector to avoid such distortion.

12 Claims, 2 Drawing Figures

APPARATUS AND METHOD FOR STEREO TELEVISION SOUND

BACKGROUND OF THE INVENTION

The present invention relates to a new and improved television audio receiver system and is more particularly directed to apparatus and a method for receiving and reproducing stereo television sound.

Under present television broadcasting standards, a band of frequencies approximately 80 KHz wide is designated within each 6 MHz television channel for the transmission of the audio component of a television signal. Within this band of frequencies, an RF main audio carrier signal is frequency modulated by an audio baseband signal for producing a main aural audio transmission signal. The transmitted main aural audio signal is received by a television receiver that converts the RF audio carrier signal to a signal having a frequency centered at 4.5 MHz. The converted 4.5 MHz sound carrier is then processed by an FM detector to reproduce the main aural audio signal that was used to frequency modulate the RF audio carrier at the transmitter.

The Federal Communications Commission has recently approved a standard for broadcasting stereophonic television sound. The standard approved uses the Zenith Broadcast Delivery System and the dbx noise-reduction system. This system was, in part, an outgrowth of the well-known techniques for transmitting stereophonic audio signals which has been popular in radio broadcasting for some time. The basic FCC-approved system for stereophonic radio broadcasting is disclosed in U.S. Pat. No. 3,257,511 to R. Adler, et al. In this system, the arithmetic sum of left (L) and right (R) audio source signals (L+R), commonly referred to as the main channel modulation, is used to directly frequency modulate the RF carrier signal. The difference between the left and right stereophonically related signals (L−R) is used to amplitude modulate a 38 KHz subcarrier signal in a suppressed carrier fashion with the resultant double-sideband signal being impressed as frequency modulation on the radiated RF carrier. In addition, a pilot subcarrier signal of 19 KHz is transmitted for synchronization of the FM receiver. The FM receiver extracts the 19 KHz pilot subcarrier, doubles its frequency, and applies the resulting 38 KHz signal to a synchronous detector where the (L−R) difference signal is recovered from the amplitude modulated 38 KHz stereophonic subcarrier. The recovered (L−R) modulation is then suitably matrixed with the (L+R) main channel modulation in order to recover the original left and right stereophonic signals.

The foregoing stereophonic radio broadcasting system often also includes an SCA component which allows broadcasters to provide a subscription background music service. The SCA component comprises a 67 KHz subcarrier frequency modulated by the background channel program, the frequency modulated subcarrier being used to frequency modulate the main RF carrier signal together with the stereophonic modulation.

Various systems and apparatus have been proposed for the transmission of stereophonic sound together with a conventional television picture transmission. These systems normally utilize the radio broadcasting stereophonic transmission techniques discussed above but with, in most cases, different subcarrier frequencies selected for their compatibility with the transmitted video signal. One such prior art system is disclosed in U.S. Pat. No. 4,048,654 to Wegner. This patent discloses a transmission system in which a composite baseband signal identical to that employed in FM stereophonic radio broadcasting is employed to frequency modulate the main sound carrier of a television transmission signal. Thus, the proposed composite baseband signal includes an (L+R) main channel component, an amplitude modulated double-sideband suppressed-carrier 38 KHz subcarrier (L−R) component and a 19 KHz pilot component. In another embodiment, the use of a subcarrier signal having a frequency ($f_H$) characterizing the transmitted video signal is proposed in lieu of the 38 KHz (L−R) channel subcarrier to reduce interference from the video component of the television signal.

Another system, which was proposed in U.S. Pat. No. 3,099,707 to R. B. Dome, also employed the conventional stereophonic radio broadcasting system but with an (L−R) channel subcarrier equal to $1.5f_H$ and a pilot signal equal to $2.5f_H$. These frequencies were selected to minimize the effect of the video components of the television signal appearing in the recovered sidebands of the (L−R) channel signal.

U.S. Pat. No. 3,046,329 to Reesor discloses yet another similar system in which the composite baseband signal used to frequency modulate the main sound carrier includes only the main channel (L+R) component and the upper sidebands of the (L−R) channel signal amplitude modulated on a subcarrier having a frequency of $2f_H$. Other prior art system for stereophonic television sound transmission have proposed the use of frequency modulated subcarriers for the (L−R) stereo channel typically centered at $2f_H$, although a center frequency of $1.5f_H$ has also been proposed.

As previously mentioned, in addition to transmitting stereophonic sound components on the main aural carrier of a transmitted television signal, it is also desirable to transmit additional information thereby more completely exercising the available audio bandwidth within a television channel. For example, the transmission of a second audio program ("SAP") signal would enable a viewer to selectively operate a television receiver for reproducing the audio signals associated with the transmitted stereophonic information, or alternatively, the audio signals associated with the transmitted second audio program which may comprise, e.g., a foreign language version of the television program.

One prior art proposal for providing a second language capability in connection with a transmitted television signal is disclosed in previously mentioned U.S. Pat. No. 4,048,654 to Wegner in which the two channels of a stereophonic-like signal are employed. In particular, the (L+R) main channel signal is used to transmit a first language audio signal and the (L−R) stereo channel signal is used to transmit a second language audio signal. U.S. Pat. No. 3,221,098 to Feldman discloses a transmission system allowing for the simultaneous broadcast of a single television program having up to four or more different language soundtracks by forming a composite baseband signal consisting of four or more different subcarrier signals each amplitude modulated with a different language audio signal, the composite baseband signal being used to frequency modulate the main RF audio carrier. Yet another proposed second language system uses a frequency modulated subcarrier baseband signal centered at $2f_H$ for both stereophonic sound transmission and for second language transmission. A pilot signal, modulated with one of two different frequencies, is used to indicate which service is being broadcast.

The foregoing systems and techniques for transmitting different audio signals in conjunction with a standard television transmission were not adopted in the U.S. for a number of reasons including, in certain cases, poor performance and, in others, incompatibility with U.S. television transmission standards.

The concept behind the Zenith stereo broadcast system adopted in the U.S. is disclosed in U.S. Pat. No. 4,405,944 to Eilers et al. This system comprises an audio transmission system that is fully compatible with U.S. television broadcasting standards and is capable of providing stereophonic sound transmission together with a second audio program service.

In the Zenith stereo broadcast delivery system, audio information is located in the region from about 4.4 to 4.6 MHz above the video carrier of a television channel allocation. The audio portion takes up only about 0.20 MHz, which is small compared to the large portion of bandwidth occupied by the video (luminance and chroma) signal. In the past, a monophonic audio channel was transmitted as an (L+R) FM signal with a frequency range of 50–15,000 Hz. In the Zenith system, a pilot signal has been added at the horizontal scanning line frequency $f_H$ (15.734 kHz) to allow new stereo receivers to locate a second channel for stereo, which resides from 16.47–46.47 kHz (centered at $2f_H$) from the bottom of the audio allocation. This second channel is the key to receiving stereo sound, as it is an (L−R) AM signal with the same frequency range as the mono channel. Stereo is achieved when the L−R and L+R signals are combined.

A third channel, the second audio program or "SAP", is provided in the Zenith system for bilingual programming and other commentary. The SAP channel is FM and extends from about 65 to 95 kHz (centered at $5f_H$) with a frequency range of 50 Hz to 12 kHz. Professional channels which may be used for voice or data can be inserted into the remaining audio space of about 98.2 kHz to 106.5 kHz (centered at $6.5f_H$). Several types of sound channel processing for these audio signals at the home television receiver are known.

One such processing technique is provided by a "separate aural carrier receiver", in which the aural carrier is processed separate from the visual carrier. Since the aural carrier is transmitted without incidental phase modulation ("ICPM"), none can reach the FM detector so that this receiver can be free of all video related buzz.

A second known receiver for television sound channel processing is referred to as the "split sound receiver". This method of sound processing was used in the early days of television before intercarrier detection was introduced. The video and sound portions of a received television signal are down converted to a lower frequency and the sound component of the composite signal is pulled off and processed to provide an audio output. In the split sound receiver technique, tuner-introduced ICPM can cause low frequency noise in the sound output.

Neither separate aural carrier receiver techniques nor split sound receiver techniques can be used in a cable television environment due to the high FM noise in the oscillators used to down convert the television signal. Expensive oscillators with separate tuning systems would be required to overcome this problem, and thus the techniques are not economically viable in cable television systems.

A third known type of sound channel processing is referred to as the "quasi-split sound receiver". In this technique, separate processing of the sound and video signals is used, but with synchronous detection combined with intercarrier sound detection. Such a receiver is disclosed in U.S Pat. No. 4,405,944 referred to above. Nyquist ICPM is eliminated in the quasi-split sound receiver by a specially designed IF filter with symmetrical response centered at the video carrier. Although this type of receiver is relatively immune to tuner-introduced ICPM, microphonics, local oscillator phase noise, reverse mixer feedthrough to the tuner of local oscillator, and to video related frequency modulation caused by the AFC/AFT circuits, it suffers from distortion caused by interfering harmonics of the television horizontal line frequency. Such harmonics fall within the pilot signal, the (L−R) subchannel and the SAP signals.

It would be advantageous to provide an apparatus and method for receiving stereo broadcast television sound which avoids such interference. Such an apparatus and method should be able to be used in the cable television environment and remain uneffected by harmonics of the television horizontal line frequency, as well as phase noise due to jitter in the cable television converter and local oscillator tuning loop.

The present invention provides an apparatus and method with these advantages, through the use of two separate receivers for the (L+R) signal and the pilot, (L−R), and SAP signals. The result is a substantially improved quality of television stereo sound reception.

SUMMARY OF THE INVENTION

In accordance with the present invention, an apparatus and method are provided for receiving and reproducing stereo television sound. A transmitted television signal includes an audio component comprising a main carrier signal frequency modulated in accordance with a composite modulation function. This function has a first component comprising the sum of first and second stereophonically related audio signals, and a second component comprising a double sideband suppressed carrier signal, formed by amplitude modulating a first subcarrier having a frequency $2f_H$ in accordance with the difference between said stereophonically related audio signals. The frequency $f_H$ is the horizontal scanning line frequency associated with the horizontal synchronization signal of the transmitted television signal.

The apparatus comprises input means responsive to the transmitted television signal for developing a first signal corresponding to the composite modulation function. Intercarrier detector means are coupled to receive the first signal for detecting the portion thereof corresponding to the first component of the composite modulation function and producing a first audio output signal comprising the sum of the stereophonically related audio signals. Independent FM detector means are coupled to receive the first signal for detecting the portion thereof corresponding to the second component of the composite modulation function and producing a second audio output signal comprising the difference of the stereophonically related audio signals. Means are coupled to receive the first and second audio output signals for producing therefrom a first channel audio output and a second channel audio output.

The apparatus can further comprise means coupled to the input means for converting the first signal to a first intermediate frequency for input to the intercarrier detector, and for converting the first signal to a second intermediate frequency for input to the independent FM detector means.

The composite modulation function can include a third component comprising a second subcarrier having a frequency $5f_H$ modulated in accordance with a third audio signal. The independent FM detector means can then be used to selectively detect the portion of the first signal corresponding to the third component and produce a third audio output signal therefrom.

At least one of the first and second audio output signals can be delayed to provide equalization therebetween. Such delay enables the first channel audio output and second channel audio output to be in proper phase.

DETAILED DESCRIPTION OF THE INVENTION

Figure 1:
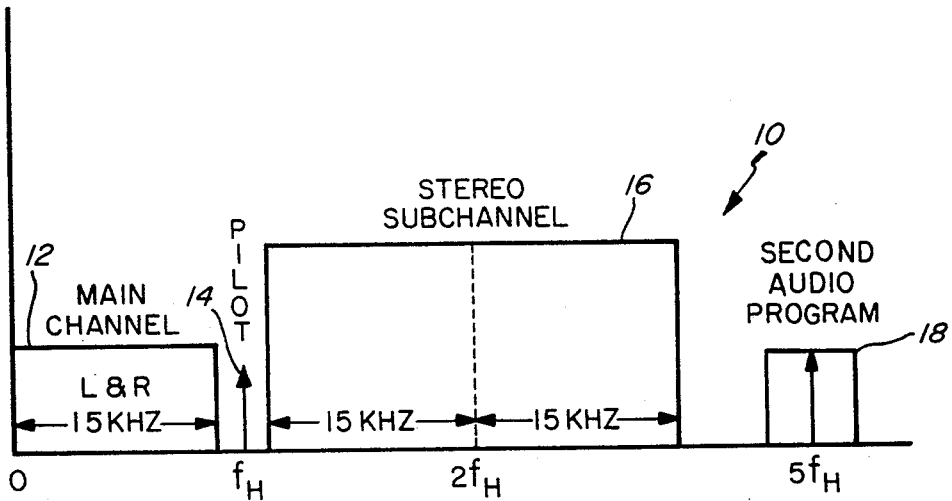
FIG. 1 is a graphic representation of the frequency spectrum of the composite baseband audio signal which is part of a transmitted television signal.

Referring now to the drawings, FIG. 1 is a graphical representation of the multichannel sound baseband signal 10 approved for use in television broadcast signals. The baseband signal includes a main channel component 12 occupying a band which extends from 50 Hz–15 KHz. The main channel is modulated by the left channel plus right channel (L+R) audio. A subcarrier stereo subchannel 16 centered at twice the television horizontal scanning frequency $f_H$ of 15.734 KHz is suppressed carrier amplitude modulated by the left minus right (L−R) audio channels. A second audio program channel 18 is provided at $5f_H$. A pilot subcarrier is inserted at the horizontal scanning frequency $f_H$. The pilot signal is used in prior art receivers to facilitate recovery of the (L−R) subcarrier by synchronization of the FM receiver. In such prior art receivers, the pilot signal at $f_H$ is extracted, doubled, and applied to a synchronous detector where the (L−R) difference signal is recovered from the amplitude modulated subcarrier at $2f_H$. This technique, which uses the intercarrier detector also used to detect the (L+R) signal, is prone to intercarrier phase modulation whereby video information is detected by the sound detector. Such video information interferes with the pilot and subcarrier areas at $f_H$, $2f_h$, etc.

The present invention overcomes this problem by using intercarrier detection to arrive at the (L+R) signal together with an independent FM detector, not phase locked to the video signal, for receiving the pilot, the (L−R), and the SAP signals. In such manner, harmonics of the television horizontal line frequency are avoided. The desired output of the independent FM detector is of a higher frequency than that of the intercarrier detector, where phase noise due to jitter in a cable television converter and local oscillator tuning loops is minimal.

Figure 2:
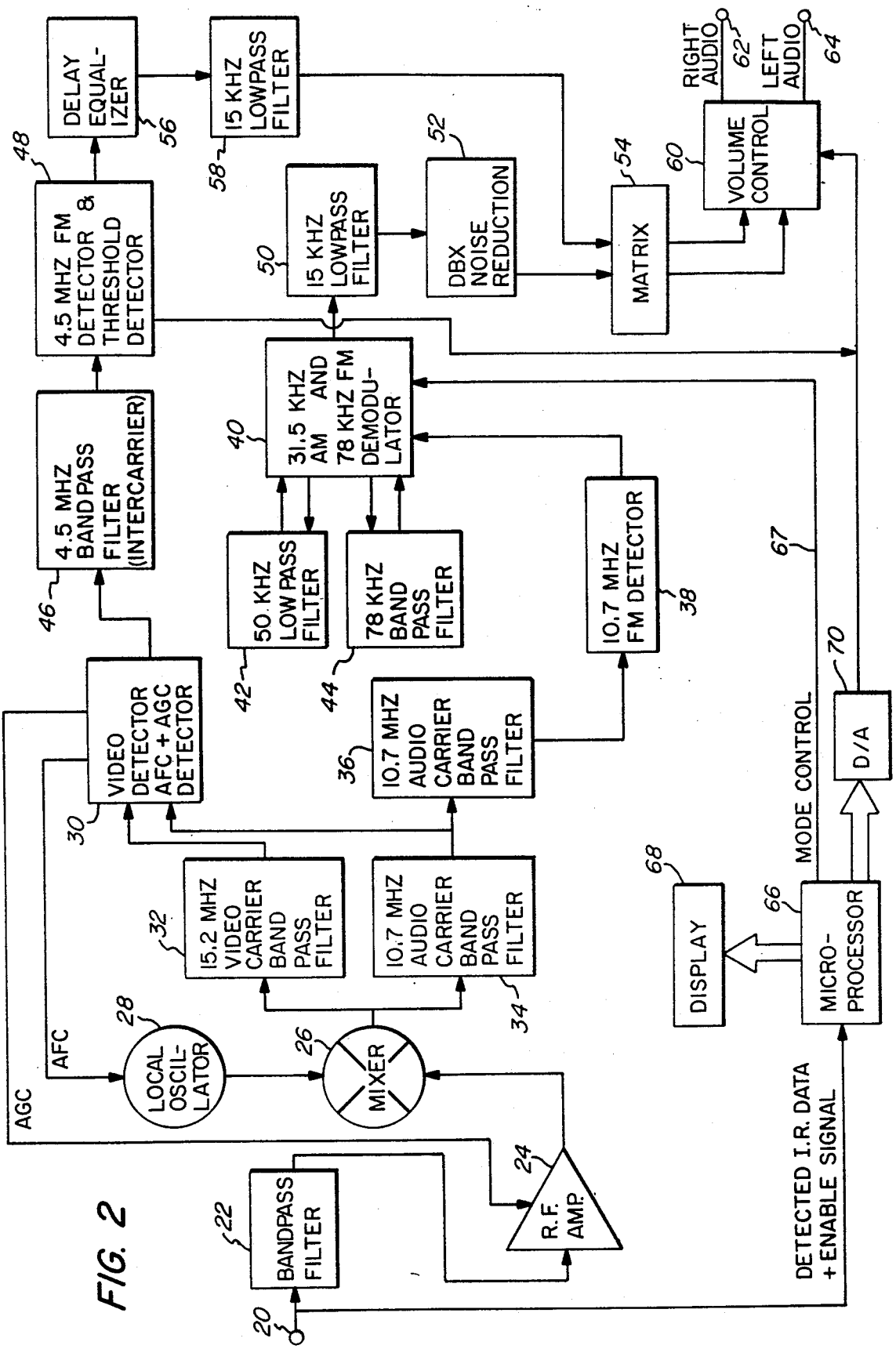
FIG. 2 is a functional block diagram of the receiver apparatus of the present invention.

FIG. 2 illustrates a cable television stereo sound adapter for reproducing stereophonic sound transmissions in accordance with the present invention. Those skilled in the art will appreciate that the teachings of the present invention can be used to receive stereophonic sound from direct broadcast television signals as well as over cable television systems. The television signal containing the composite modulation function illustrated in FIG. 1 is received at terminal 20 which is coupled to a bandpass filter 22 and a microprocessor 66. The signal input at terminal 20 can include data, e.g., from a cable television remote control, that is used by microprocessor 66 to execute various functions selected by a user. For example, a user can select to receive the main stereophonic signal or the alternate SAP channel, and microprocessor 66 will output a signal on line 67 to execute the user's choice. Remote control of the sound volume is accomplished via a digital to analog converter 70 that is accessed by microprocessor 66 to control a volume control circuit 60. A display 68 associated with microprocessor 66 is provided to give a user visual feedback as to the selections made via the remote control.

Bandpass filter 22 is used to separate the video and multichannel sound RF signals from any other signals (such as the data signals referred to above) present at input terminal 20. The video and multichannel sound RF signal is passed from bandpass filter 22 to an RF amplifier 24. The amplified RF signal is then coupled to a mixer 26 which, in combination with local oscillator 28, converts the frequency of the amplified RF signal to a new "intermediate" frequency. If, for example, the signal output from RF amplifier 24 contains components at 41.25 and 45.75 MHz, and local oscillator 28 runs at 30.55 MHz, the signal output from mixer 26 will contain frequency components at 15.2 MHz and 10.7 MHz.

The output from mixer 26 is input to a bandpass filter 32 with a center frequency of 15.2 MHz (video carrier) and a bandpass filter 34 with a center frequency at 10.7 MHz (audio carrier). Bandpass filter 32 can, for example, comprise a simple L−C filter while bandpass filter 34 is preferably a ceramic filter.

The output of bandpass filter 32 is input to a video detector 30, which also includes an automatic frequency control ("AFC") and automatic gain control ("AGC") detector. The AFC and AGC signals are applied to local oscillator 28 and RF amplifier 24, respectively. Video detector 30 also receives the output of bandpass filter 34. The resulting output from detector 30 contains the main channel component 12 of the audio carrier signal having a center frequency of at 4.5 MHz (15.2 MHz-10.7 MHz). The converted 4.5 MHz sound carrier is then processed by an FM detector 48, after being filtered by a 4.5 MHz bandpass filter 46, to reproduce the (L+R) audio signal that was used to frequency modulate the audio carrier at the television signal transmitter.

The output from FM detector 48 is input to a delay equalizer 56 that provides equalization between the (L+R) signal and the (L−R) signal that is retrieved by a separate independent FM detector as described below. After the (L+R) signal is delayed by an appropriate time period, it is passed through a 15 KHz low pass filter to limit the signal to the audio frequencies to be ultimately reproduced. This signal is then input to a conventional matrix 54 that combines it with the (L−R) signal to reproduce a right channel audio signal at terminal 62 and a left channel audio signal at terminal 64.

In order to recover the pilot, (L−R), and SAP signals, the output of bandpass filter 34 is passed through a second (preferably ceramic) bandpass filter 36 that provides additional filtering for high fidelity sound reproduction. The output of filter 36 is input to a 10.7 MHz FM detector 38, that recovers the (L−R) and SAP components 16 and 18, respectively, illustrated in FIG. 1. The detected signal is passed to a demodulator 40 that selectively demodulates the AM (L−R) signal at 31.5 KHz ($2f_H$) or the FM SAP signal at 78 KHz ($5f_H$). Demodulator 40 utilizes a 50 KHz low pass filter 42 for demodulating the (L−R) component or, alternately, a 78 KHz bandpass filter 44 to demodulate the SAP component. Selection of the component to be demodulated is made via a mode control signal outputted by microprocessor 66 on line 67.

The demodulated output from demodulator 40 is input to a 15 KHz low pass filter 50 that limits the signal to the band of audio frequencies to be reproduced. The signal is then input to a standard dbx noise reduction circuit 52 and passed to matrix 54 where the (L−R) signal is combined with the (L+R) signal to produce the desired right and left audio channels.

It will now be appreciated that the present invention provides reproduction of stereo broadcast television sound without distortion due to video information interfering with the pilot signal, (L−R) subcarrier, and SAP subcarrier components of the multichannel sound baseband signal. In accordance with the present invention, the best (L+R) channel performance is achieved using a quasi-parallel intercarrier detector. Improved (L−R) channel and SAP channel performance is achieved by using a separate sound detector instead of the same intercarrier detector used for recovering the (L+R) component. In this manner, interfering harmonics of the television horizontal line frequency with vertical scan frequency sidebands that fall within the pilot, the (L−R) subchannel, and the SAP signals are prevented from distorting the stereo audio or SAP output. By using the higher frequency components only of the separate FM detector, where phase noise due to jitter is minimal, and recovering the (L+R) channel using a standard intercarrier detector at lower frequencies (where phase noise would be severe), the quality of television stereo sound reception is greatly improved.

We claim:

1. Apparatus for receiving and reproducing stereo television sound characterized by a transmitted audio signal comprising a main carrier signal, frequency modulated in accordance with a composite modulation function having a first component comprising the sum of first and second stereophonically related audio signals, and a second component comprising a double sideband suppressed carrier signal, formed by amplitude modulating a first subcarrier having a frequency $2f_H$ in accordance with the difference between said stereophonically related audio signals, where $f_H$ is the horizontal scanning line frequency associated with the horizontal synchronization signal of a transmitted television signal, said apparatus comprising:

input means responsive to a transmitted television signal for developing a first signal corresponding to said composite modulation function;

intercarrier detector means coupled to receive said first signal for detecting the portion thereof corresponding to the first component of the composite modulation function and producing a first audio output signal comprising the sum of said stereophonically related audio signals;

independent FM detector means coupled to receive said first signal for detecting the portion thereof corresponding to the second component of the composite modulation function and producing a second audio output signal comprising the difference of said stereophonically related audio signals; and means coupled to receive said first and second audio output signals for producing therefrom a first channel audio output and a second channel audio output.

2. The apparatus of claim 1 further comprising:

means coupled to said input means for converting said first signal to a first intermediate frequency for input to said intercarrier detector and for converting said first signal to a second intermediate frequency for input to said independent FM detector means.

3. The apparatus of claim 2 wherein said composite modulation function further includes a third component comprising a second subcarrier having a frequency $5f_H$ modulated in accordance with a third audio signal, and said independent FM detector means comprises means for selectively detecting the portion of said first signal corresponding to said third component and producing a third audio output signal therefrom.

4. The apparatus of claim 1 further comprising:

means for delaying at least one of said first and second audio output signals to provide equalization therebetween enabling said first channel audio output and second channel audio output to be in phase.

5. Apparatus for receiving and reproducing stereo television sound characterized by a transmitted audio signal comprising a main carrier signal, frequency modulated in accordance with a composite modulation function having a first component comprising the sum of first and second stereophonically related audio signals, and a second component comprising a double sideband suppressed carrier signal, formed by amplitude modulating a first subcarrier having a frequency $2f_H$ in accordance with the difference between said stereophonically related audio signals, where $f_H$ is the horizontal scanning line frequency associated with the horizontal synchronization signal of a transmitted television signal, said apparatus comprising:

tuner means for receiving a transmitted television signal including said audio signal;

frequency converter means coupled to said tuner means for converting the received audio signal to a first sound carrier centered at a first intermediate frequency and a second sound carrier centered at a second intermediate frequency;

first detector means coupled to receive said first sound carrier for producing a first audio output signal corresponding to one component of said composite modulation function; and second detector means coupled to receive said second sound carrier for producing a second audio output signal corresponding to another component of said composite modulation function.

6. The apparatus of claim 5 wherein the first detector means is an intercarrier detector and recovers said first component of the composite modulation function.

7. The apparatus of claim 6 wherein said composite modulation function further includes a third component comprising a second subcarrier having a frequency $5f_H$ modulated in accordance with a third audio signal, and said second detector means comprises means for selectively recovering said second component or said third component of the composite modulation function.

8. The apparatus of claim 7 wherein said first intermediate frequency is 4.5 MHz and said second intermediate frequency is 10.7 MHz.

9. The apparatus of claim 5 further comprising:
means for delaying at least one of said first and second audio output signals to provide phase equalization therebetween.

10. A method for providing reception and reproduction of stereo sound in a television signal comprising the steps of:
tuning to a transmitted television signal that contains an audio component comprising a main carrier signal, frequency modulated in accordance with a composite modulation function having a first component comprising the sum of first and second stereophonically related audio signals, and a second component comprising a double sideband suppressed carrier signal, formed by amplitude modulating a first subcarrier having a frequency $2f_H$ in accordance with the difference between said stereophonically related audio signals, where $f_H$ is the horizontal scanning line frequency associated with the horizontal synchronization signal of a transmitted television signal;
converting the audio component of said television signal to produce a first sound carrier centered at a first intermediate frequency and a second sound carrier centered at a second intermediate frequency;
detecting the first component of said composite modulation function from the first sound carrier at the first intermediate frequency;
detecting the second component of said composite modulation function from the second sound carrier at the second intermediate frequency; and
combining the detected first and second components to produce a left channel audio output and a right channel audio output.

11. The method of claim 10 comprising the further step of:
delaying at least one of said first and second detected components prior to said combining step to provide a proper phase relationship therebetween.

12. The method of claim 11 comprising the further steps of:
selectively detecting from the second sound carrier a third component of said composite modulation function comprising a second subcarrier having a frequency $5f_H$ modulated in accordance with a third audio signal; and
producing a second audio program output from the detected third component.

* * * * *